(12) United States Patent
Rensburg

(10) Patent No.: US 9,906,471 B1
(45) Date of Patent: Feb. 27, 2018

(54) SYSTEM, DEVICE, AND METHOD FOR MANAGING COMPOSITION OF ELECTRONIC MESSAGES USING TEMPORARY SUSPENSIONS

(71) Applicant: RingCentral, Inc., Belmont, CA (US)

(72) Inventor: Christopher Van Rensburg, Foster City, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 15/248,153

(22) Filed: Aug. 26, 2016

(51) Int. Cl.
*H04L 12/58* (2006.01)
*G06F 17/24* (2006.01)

(52) U.S. Cl.
CPC ............ *H04L 51/04* (2013.01); *G06F 17/24* (2013.01); *H04L 51/16* (2013.01)

(58) Field of Classification Search
CPC .................................................. G06Q 10/107
See application file for complete search history.

(56) References Cited

U.S. PATENT DOCUMENTS

| 2008/0162651 | A1* | 7/2008 | Madnani | G06Q 10/107 |
| | | | | 709/206 |
| 2013/0086175 | A1* | 4/2013 | Claux | G06F 17/211 |
| | | | | 709/206 |
| 2013/0097526 | A1* | 4/2013 | Stovicek | G06Q 10/107 |
| | | | | 715/752 |
| 2013/0318176 | A1* | 11/2013 | Claux | G06Q 10/107 |
| | | | | 709/206 |
| 2013/0332850 | A1* | 12/2013 | Bovet | H04L 51/22 |
| | | | | 715/752 |
| 2014/0245178 | A1* | 8/2014 | Smith | H04L 51/16 |
| | | | | 715/753 |
| 2015/0302334 | A1* | 10/2015 | Thomas | G06F 3/0484 |
| | | | | 705/7.26 |

\* cited by examiner

*Primary Examiner* — Shirley Zhang
(74) *Attorney, Agent, or Firm* — Finnegan, Henderson, Farabow, Garrett & Dunner LLP

(57) ABSTRACT

A communications device for managing composition of electronic messages using temporary suspensions is disclosed. The communications device includes a network interface, a memory, and a processor in communication with the network interface and the memory. The processor is configured to receive a request to suspend composition of a first electronic message in an input field associated with an electronic message exchange between two or more participants, store in the memory the first electronic message, and clear the input field for composition of a second electronic message. Responsive to a trigger indicating resumption of composition of the first electronic message, the processor is further configured to insert the first electronic message in the input field, thereby enabling completion of the composition of the first electronic message, and to add the first electronic message to a thread of the electronic message exchange. The first electronic message is displayed in the thread of the electronic message exchange chronologically after the second electronic message.

21 Claims, 13 Drawing Sheets

SYSTEM, DEVICE, AND METHOD FOR MANAGING COMPOSITION OF ELECTRONIC MESSAGES USING TEMPORARY SUSPENSIONS

TECHNICAL FIELD

The present disclosure relates to communications systems and, more particularly, to systems, devices, and methods for temporarily suspending composition of electronic messages.

BACKGROUND

The popularity of live chat applications on communications systems keeps growing. In live chat applications users can transmit messages to each other, such that one user may send several messages before receiving a response. Typically, users use input fields of user interfaces generated on displays of user devices to compose messages using chat applications. A situation that frequently occurs in chat conversations is that a new message arrives while a user is busy using an input field to compose a further message. The newly received message may include new information or a pressing question that requires the user's immediate response. In this situation the user may want to respond to the received message but have the option of continuing to compose the incomplete message after responding to the new message. In a typical chat application handling this situation requires the user to select then copy the incomplete message (e.g. by copying to the clipboard) and paste it back into the input field after replying to the new message. This solution, however, requires multiple interactions that are particularly cumbersome to perform on a mobile electronic device having a small input device and/or display due to size limitations. Moreover, during the act of responding to the new message the incomplete message may be deleted. For example, copying a Web URL or an image to the clipboard as part of responding to the new message may overwrite the incomplete message.

Some chat applications provide the option to save drafts of unsent and incomplete messages. Yet, the process of retrieving these drafts is usually outside the user interface of the live chat. Moreover, it is difficult for the chat applications to determine the reason why an unsent message was not sent.

For these and other reasons, it is desired to have a solution that addresses the need to temporarily suspend composition of messages. A solution that is integral with a live chat application and that improves the flow of a live chat conversation is desirable.

SUMMARY

In one disclosed embodiment, a communications device supporting electronic message exchange is disclosed. The communications device comprises at least one network interface, a memory, and at least one processor in communication with the network interface and the memory. The at least one processor is configured to receive a request to suspend composition of a first electronic message in an input field associated with an electronic message exchange between two or more participants, store in the memory the first electronic message, and clear the input field for composition of a second electronic message. Responsive to a trigger indicating resumption of composition of the first electronic message, the at least one processor inserts the first electronic message in the input field, thereby enabling completion of the composition of the first electronic message, and add the first electronic message to a thread of the electronic message exchange. The first electronic message is displayed in the thread of the electronic message exchange chronologically after the second electronic message.

In another disclosed embodiment a computer program is provided. The computer program is embodied in a non-transitory computer readable medium and is executable by at least one processor associated with a memory. The computer program may include instructions for supporting electronic message exchange, including: receiving a request to suspend composition of a first electronic message in an input field associated with an electronic message exchange between two or more participants; storing in the memory the first electronic message and clearing the input field for composition of a second electronic message; responsive to a trigger indicating resumption of composition of the first electronic message, inserting the first electronic message in the input field, thereby enabling completion of the composition of the first electronic message; and adding the first electronic message to a thread of the electronic message exchange, wherein the first electronic message is displayed in the electronic message exchange chronologically after the second electronic message.

In another disclosed embodiment a server for supporting electronic message exchange is provided. The server comprises at least one network interface, a memory, and at least one processor in communication with the network interface and the memory. The at least one processor is configured to receive a request to suspend composition of a first electronic message in an input field associated with an electronic message exchange between two or more participants, store in the memory the first electronic message, and clear the input field for composition of a second electronic message. After the second electronic message is added to the electronic message exchange, the at least one processor is further configured to automatically insert the first electronic message in the input field, thereby enabling completion of the composition of the first electronic message, and add the first electronic message to a thread of the electronic message exchange. The first electronic message is displayed in thread of the electronic message exchange chronologically after the second electronic message.

BRIEF DESCRIPTION OF THE DRAWINGS

The accompanying drawings, which are incorporated in and constitute part of this disclosure, together with the description, illustrate and serve to explain the principles of various example embodiments.

DETAILED DESCRIPTION

Reference will now be made in detail to the example embodiments implemented according to the present disclosure, the examples of which are illustrated in the accompanying drawings. Wherever possible the same reference numbers will be used throughout the drawings to refer to the same or like parts.

Figure 1:
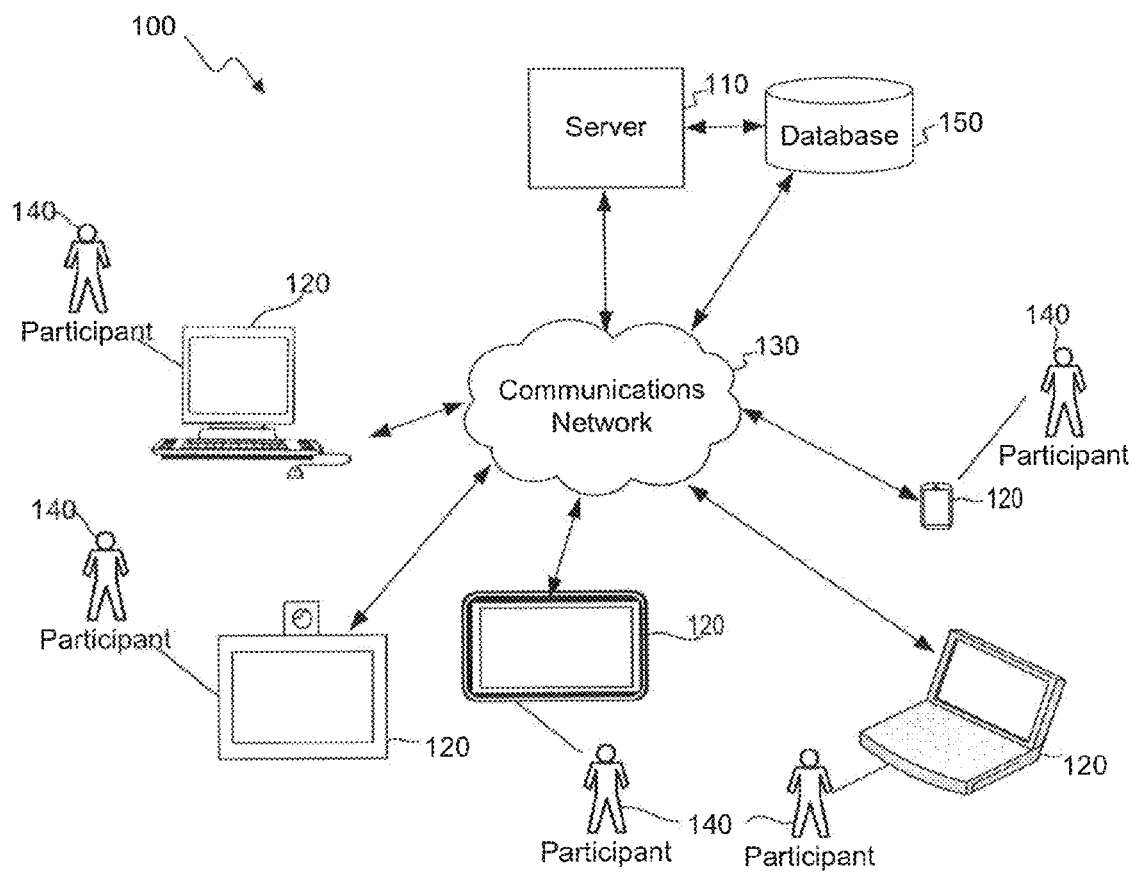
FIG. 1 is a diagram illustrating an example communications system in which various embodiments described herein may be practiced.

FIG. 1 shows an example of a communications system 100 in which various implementations as described herein may be practiced. As shown in FIG. 1, communications system 100 may include a plurality of communications devices such as a server 110 and terminal devices 120 operatively connected to a communications network 130. In one embodiment, server 110 may be communicatively coupled with terminal devices 120 and may support electronic message exchange between a plurality of participants 140. In one example, server 110 may be a dedicated server that enables two or more participants 140 using their associated terminal devices 120 to engage in a live electronic message exchange, such as chat conversation and instant messaging (IM). In another example, server 110 may be a system associated with a communication service provider which provides a variety of data or services such as messaging real-time audio/video to participants 140. It is noted that the terms "user," "subscriber," "participant," and "recipient" may be used in the interest of brevity and may refer to any of a variety of entities that may be, for example, a person, an organization, an organizational role within an organization, a group within an organization, etc.

Communications system 100 represents a computer-based system that includes computer system components, desktop computers, workstations, tablets, handheld computing devices, memory devices, and/or internal network(s) connecting the components. Communications system 100 may include or be connected to various network computing resources (for example, servers, routers, switches, network connections, storage devices, etc.) necessary to support the services provided by communications system 100. For example, server 110 may be coupled to one or more physical or virtual storages such as database 150. In one embodiment database 150 may be configured to store current and/or historical electronic messages of an electronic message exchange and/or any previously completed electronic message exchanges. The data stored in database 150 may be transmitted to server 110 before or during an ongoing electronic message exchange. While database 150 is illustrated as an external device connected to server 110, database 150 may also reside within server 110 as an internal component of server 110. In some embodiments, database 150 may be stored in a cloud-based server (not shown) that is accessible by server 110 and/or terminal devices 120 through communications network 130.

Communications network 130 facilitates communications and sharing of content between terminal devices 120 and server 110. Communications network 130 may be any type of network that provides communications, exchanges information, and/or facilitates the exchange of information between communications network 130 and terminal devices 120. For example, communications network 130 may be the Internet, a Local Area Network, a cellular network, a public switched telephone network (PSTN), or other suitable connection(s) that enables communications system 100 to send and receive information between the components of communications system 100. Communications network 130 may support a variety of messaging formats and may further support a variety of services and applications for terminal devices 120.

FIG. 1 further shows different types of terminal devices 120. Terminal device 120 represents any type of communications device that can communicate with each other and/or with server 110. Terminal device 120 may include an electronic device such as a laptop, a desktop computer, a smartphone, wearable devices such as a smartwatch or smartglasses, a tablet, an e-Reader, a set top box, a gaming console, etc.

The components and arrangements shown in FIG. 1 are not intended to limit the disclosed embodiments, as the system components used to implement the disclosed processes and features can vary. For example, communications system 100 may include multiple servers 110, and each server 110 may host a certain type of communication service, e.g., instant messaging (IM), Voice over Internet Protocol (VoIP), video conferencing, such that various types of multimedia services may be provided to terminal devices 120.

Figure 2:
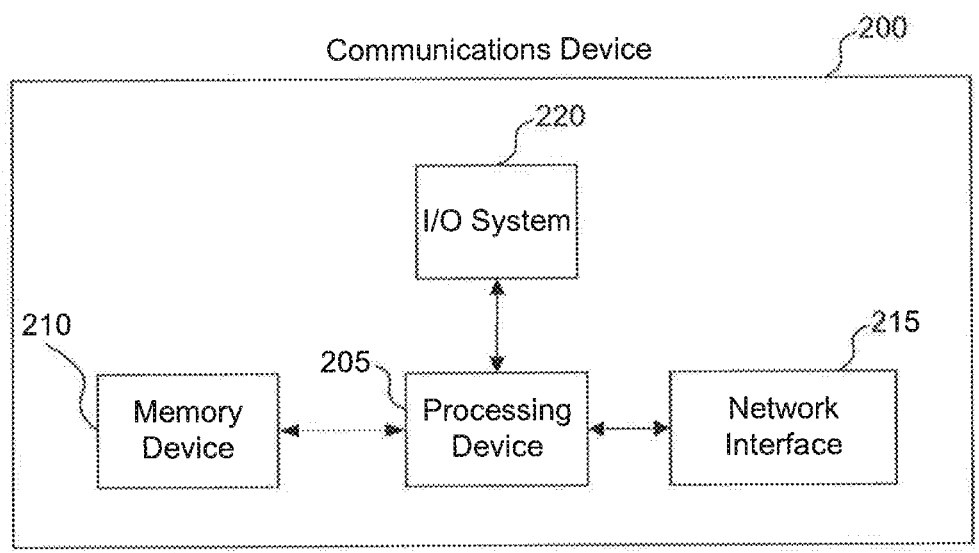
FIG. 2 is a diagram illustrating the components of an example communications device for implementing embodiments consistent with the present disclosure.
Figure 3:
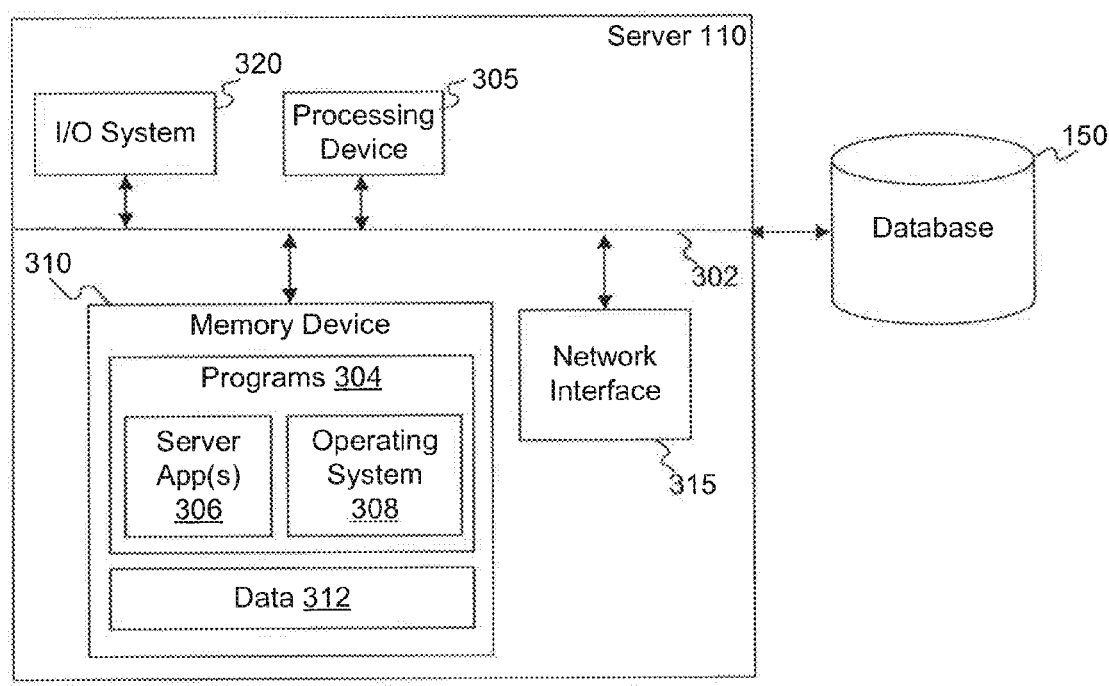
FIG. 3 is a diagram illustrating the components of an example communication server, consistent with the disclosed embodiments.
Figure 4:
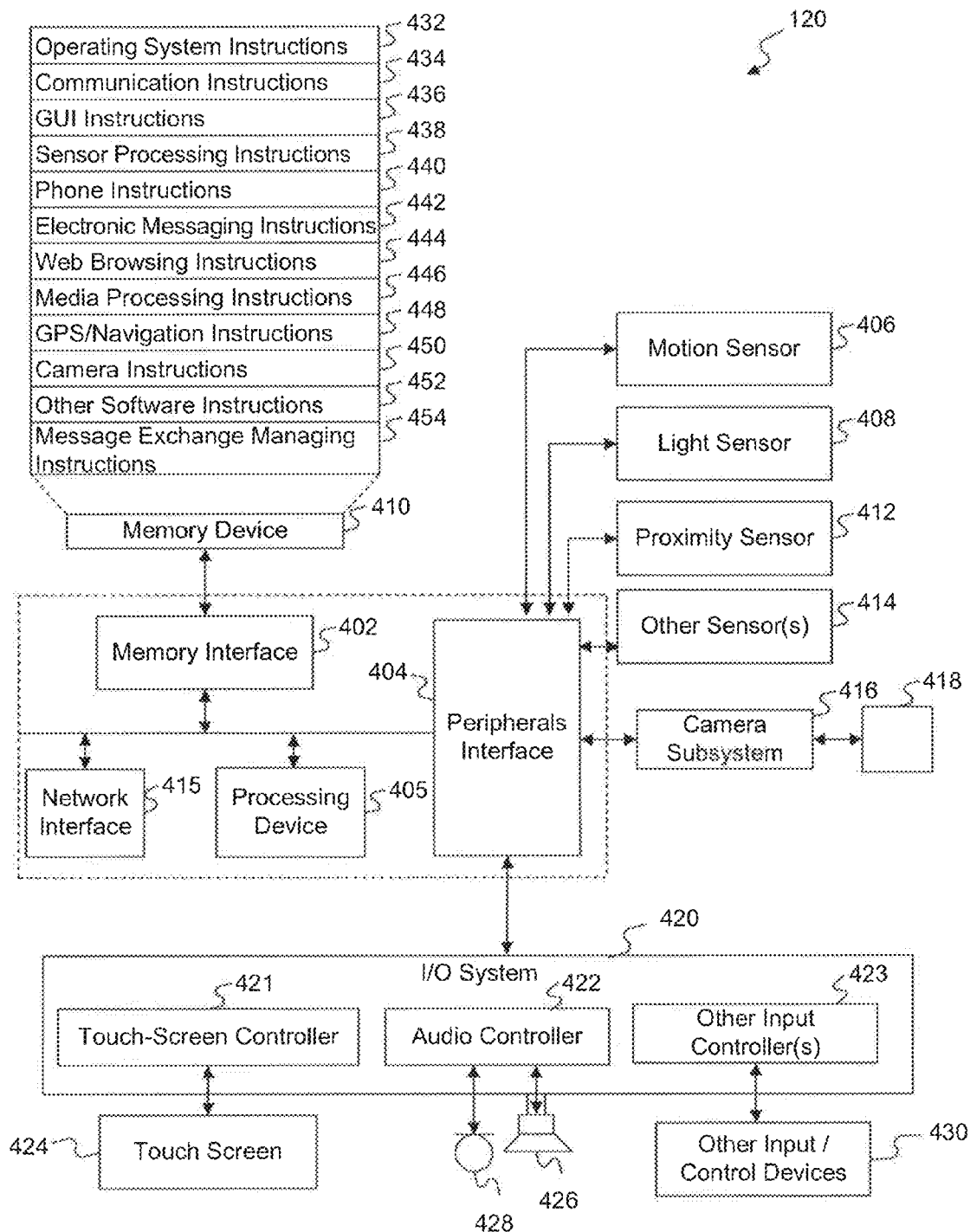
FIG. 4 is a diagram illustrating the components of an example terminal device for implementing embodiments consistent with the present disclosure.

FIG. 2 illustrates the components of an example communications device 200. The term "communications device" refers to any device configured to transmit and receive data by wired or wireless transmission. For example, communications device 200 may include, but is not limited to, server 110 and terminal device 120. Communications device 200 may comprise a bus or any other communication mechanism for interconnecting subsystems and components. As shown in FIG. 2, communications device 200 includes a processing device 205, a memory device 210, a network interface 215 (for example, a modem, Ethernet card, or any other interface configured to exchange data with a communications network), and an input/output (110) system 220 that may include an input device (for example, keyboard, touch screen, a microphone, a camera) and an output device (for example, a speaker or a display). The various components in communications device 200 may be coupled by one or more communication buses or signal lines. One skilled in the art will appreciate that the configuration of communications device 200 may have numerous variations and modifications. One example of the configuration of communications device 200 is server 110, which is illustrated in FIG. 3. Another example of the configuration of communications device 200 is terminal device 120, which is illustrated in FIG. 4. Therefore, the configuration shown in FIG. 2 should not be considered essential for the operation of communications device 200.

Processing device 205, shown in FIG. 2, may include at least one processor and be configured to execute computer programs, applications, methods, processes, or other software to perform embodiments described in the present disclosure. The term "processing device" refers to any physical device having an electric circuit that performs a logic operation. For example, the processing device may include one or more integrated circuits, microchips, microcontrollers, microprocessors, all or part of a central processing unit (CPU), graphics processing unit (CPU), digital signal processor (DSP), field programmable gate array (FPGA), or other circuits suitable for executing instructions or performing logic operations. In some embodiments, processing device 205 may be associated with a software product stored on a memory device 210 or a non-transitory computer readable medium. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, and any other known physical storage medium. The terms "memory" and "computer-readable storage medium" may refer to multiple structures, such as a plurality of memories or computer-readable storage mediums located at communications device 200 or at a remote location. Memory device 210 or a computer-readable storage medium can store instructions for execution by processing device 205, including instructions for causing the processing device 205 to perform steps consistent with embodiments of the present disclosure herein. Additionally, one or more computer-readable storage mediums can be utilized in implementing a computer-implemented method. The term "computer-readable storage medium" should be understood to include tangible items and exclude carrier waves and transient signals.

FIG. 3 is a diagram of an example server 110 used to implement computer programs, applications, methods, processes, or other software to perform embodiments described in the present disclosure. Consistent with the present disclosure, server 110 may be one type of communications device 200. Server 110 includes a bus 302 (or other communication mechanism) that interconnects subsystems and components for transferring information within server 110. As shown, server 110 includes processing device 305, I/O system 320, network interface 315, and memory device 310 that may store programs 304 including, for example, server app(s) 306, operating system 308, and data 312. In some embodiments, server 110 can communicate with an external database such as database 150.

Processing device 305 may include at least one processor configured to perform functions of the disclosed methods such as a microprocessor manufactured by Intel™ or manufactured by AMD™. Processing device 305 may include a single core or multiple core processors executing parallel processes simultaneously. For example, processing device 305 may be a single core processor configured with virtual processing technologies. In certain embodiments, processing device 305 may use logical processors to simultaneously execute and control multiple processes. Processing device 305 may implement virtual machine technologies, or other technologies to provide the ability to execute, control, run, manipulate, store, etc., multiple software processes, applications, programs, etc. In some embodiments, processing device 305 may include a multiple-core processor arrangement (e.g., dual, quad core, etc.) configured to provide parallel processing functionalities to allow server 110 to execute multiple processes simultaneously. It is appreciated that other types of processor arrangements could be implemented to provide the capabilities disclosed herein.

Memory device 310 may be a volatile, non-volatile, magnetic, semiconductor, tape, optical, removable, non-removable, or other type of storage device or tangible or non-transitory computer-readable medium that stores one or more program(s) 304 and data 312. Common forms of non-transitory media include, for example, a flash drive, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Server 110 may include one or more storage devices configured to store information used by processing device 305 (or other components) to perform certain functions related to the disclosed embodiments. For example, server 110 may include memory device 310 that includes instructions to enable processing device 305 to execute one or more applications, such as server apps 306, operating system 308, and any other type of application or software known to be available on computer systems. Alternatively or additionally, the instructions, application programs, etc. may be stored in database 150 (which can also be internal to server 110) or external storage communicatively coupled with server 110 (not shown) such as one or more databases or memory that may be accessed using communications network 130.

Database 150 or other external storage may be a volatile or non-volatile, magnetic, semiconductor, tape, optical, removable, non-removable, or other type of storage device or tangible or non-transitory computer-readable medium. Memory device 310 and database 150 may include one or more memory devices that store data and instructions used to perform one or more features of the disclosed embodiments. Memory device 310 and database 150 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

In some embodiments, server 110 may be communicatively connected to one or more remote memory devices (e.g., remote databases, not shown) through communications network 130 or a different network. The remote memory devices can be configured to store information that server 110 can access and/or manage. By way of example, the remote memory devices could be document management systems, Microsoft SQL database, SharePoint databases, Oracle™ databases, Sybase™ databases, or other relational databases. Systems and methods consistent with disclosed embodiments, however, are not limited to separate databases or even to the use of a database.

The programs 304 include one or more software modules that when executed by processing device 305 cause processing device 305 to perform one or more functions of the disclosed embodiments. Moreover, processing device 305 may execute one or more programs located remotely from one or more components of the communications system 100. For example, server 110 may access one or more remote programs that, when executed, perform functions related to disclosed embodiments.

In the presently described embodiment, server app(s) 306 may cause processing device 305 to perform one or more functions of the disclosed methods. For example, server app(s) 306 may cause processing device 305 to suspend composition of an electronic message in an electronic message exchange between two or more participants, identify a trigger, and enable completion of the composition of the suspended electronic message. In some embodiments, other components of the communications system 100 may be configured to perform one or more functions of the disclosed methods. For example, terminal device 120 may be configured to provide a GUI feature to generate a request to suspend composition of an electronic message.

In some embodiments, the programs 304 may include the operating system 308 performing operating system functions when executed by processing device 305. By way of example, operating system 308 may include Microsoft Windows™, Unix™, Linux™, Apple™ operating systems, Personal Digital Assistant (PDA) type operating systems, such as Apple iOS, Google Android, Blackberry OS, or other types of operating systems. Accordingly, disclosed embodiments may operate and function with computer systems running any type of operating system 308. Server 110 may also include software that, when executed by processing device 305, provides communications with communications network 130 through network interface 315 and/or a direct connection to a plurality of terminal devices 120. In addition, memory device 310 includes data 312 that include, for example, one or more incomplete electronic messages of one or more users, timestamps associated with the incomplete electronic messages, profiles of users, and more.

In some embodiments, I/O system 320 may include one or more interfaces for receiving signals or input from devices and providing signals or output to one or more devices that allow data to be received and/or transmitted by server 110. For example, server 110 may include interface components for interfacing with one or more input devices, such as one or more keyboards, pointing devices, and the like, that enable server 110 to receive input from an operator or administrator (not shown).

FIG. 4 is a diagram of an example terminal device 120 used to implement computer programs, applications, methods, processes, or other software to perform embodiments described in the present disclosure. Consistent with the present disclosure, terminal device 120 is one type of communications device 200. Terminal device 120 may include, processing device 405, network interface 415, memory interface 402, and a peripherals interface 404. These components can be separated or can be integrated in one or more integrated circuits. The various components in terminal device 120 can be coupled by one or more communication buses or signal lines.

Sensors, devices, and subsystems can be coupled to the peripherals interface 404 to facilitate multiple functionalities. For example, a motion sensor 406, a light sensor 408, and a proximity sensor 412 can be coupled to the peripherals interface 404 to facilitate orientation, lighting, and proximity functions. Other sensors 414 can also be connected to the peripherals interface 404, such as a positioning system (e.g., GPS receiver), a temperature sensor, a biometric sensor, or other sensing device, to facilitate related functionalities, A GPS receiver can be integrated with, or connected to, terminal device 120. For example, a GPS receiver can be built into mobile telephones, such as smartphone devices. GPS software allows mobile telephones to use an internal or external GPS receiver (e.g., connecting via a serial port or Bluetooth). A camera subsystem 416 and an optical sensor 418, e.g., a charged coupled device (CCD) or a complementary metal-oxide semiconductor (CMOS) optical sensor, may be utilized to facilitate camera functions, such as recording photographs and video clips.

Communication functions may be facilitated through network interface 415, which may be a Ethernet port connected to radio frequency receivers and transmitters and/or optical (e.g., infrared) receivers and transmitters. The specific design and implementation of network interface 415 depends on the communication network(s) over which terminal device 120 is intended to operate. For example, in some embodiments, terminal device 120 includes network interface 415 designed to operate over a GSM network, a GPRS network, an EDGE network, a Wi-Fi or WiMax network, and a Bluetooth® network.

I/O system 420 may include a touch screen controller 421, audio controller 422, and/or other input controller(s) 423. Touch screen controller 421 is coupled to a touch screen 424. Touch screen 424 and touch screen controller 421 can, for example, detect contact, movement or break thereof using any of a plurality of touch sensitivity technologies, including but not limited to capacitive, resistive, infrared, and surface acoustic wave technologies as well as other proximity sensor arrays or other elements for determining one or more points of contact with the touch screen 424. Touch screen 424 can also, for example, be used to implement virtual or soft buttons and/or a keyboard. While a touch screen 424 is shown in FIG. 4, I/O system 420 may include a display screen (e.g., CRT or LCD) in place of the touch screen 424.

Audio controller 422 may be coupled to a speaker 426 and a microphone 428 to facilitate voice-enabled functions such as voice recognition, voice replication, digital recording, and telephony functions. The other input controller(s) 423 may be coupled to other input/control devices 430 such as one or more buttons, rocker switches, thumb-wheel, infrared port, USB port, and/or a pointer device such as a stylus.

Memory interface 402 may be coupled to memory device 410. Memory device 410 may include high-speed random access memory and/or non-volatile memory such as one or more magnetic disk storage devices, one or more optical storage devices, and/or flash memory (e.g., NAND, NOR). Memory device 210 may store an operating system 432, such as DRAWIN, RTXC, LINUX, iOS, UNIX, OS X, WINDOWS, or an embedded operating system such as VXWorkS. The operating system 432 can include instructions for handling basic system services and for performing hardware dependent tasks. In some implementations, the operating system 432 can be a kernel (e.g., UNIX kernel).

Memory device 410 may also store communication instructions 434 to facilitate communicating with one or more additional devices, one or more computers and/or one or more servers. The memory device 410 can include graphical user interface instructions 436 to facilitate graphic user interface processing; sensor processing instructions 438 to facilitate sensor-related processing and functions; phone instructions 440 to facilitate phone-related processes and functions; electronic messaging instructions 442 to facilitate electronic-messaging related processes and functions; web browsing instructions 444 to facilitate web browsing-related processes and functions; media processing instructions 446 to facilitate media processing-related processes and functions; GPS/navigation instructions 448 to facilitate GPS and navigation-related processes and instructions; camera instructions 450 to facilitate camera-related processes and functions; and/or other software instructions 452 to facilitate other processes and functions. Memory device 410 may also include electronic message exchange managing instructions 454 to facilitate chat related processes and instructions.

In some embodiments, terminal device 120 may include software applications to facilitate connection with server 110 that hosts an electronic message exchange between two or more users. Graphical user interface instructions 436 may include a software program that enables a user associated with terminal device 120 to receive electronic messages from server 110, provide user input, and so on. Further, terminal device 120 may include software applications that enable a user to suspend composition of an electronic message in an electronic message exchange between two or more participants, identify a trigger, and enable completion of the composition of the suspended electronic message. Graphical user interface instructions 436 may include software programs that enable a user associated with terminal device 120 to generate a request to temporarily suspend composition of electronic messages in chat conversations.

Each of the above identified instructions and applications may correspond to a set of instructions for performing one or more functions described above. These instructions need not be implemented as separate software programs, procedures, or modules. Memory device 410 may include additional instructions or fewer instructions. Furthermore, various functions of terminal device 120 may be implemented in hardware and/or in software, including in one or more signal processing and/or application specific integrated circuits.

FIGS. 5A-5F depict example GUIs for temporarily suspending composition of electronic messages in chat conversations. Specifically, the example GUIs depicted in FIGS. 5A-5F illustrate embodiments in which composition of a first electronic message is suspended, a second electronic message is added to the conversation, and then the composition of the first electronic message is resumed. The diagrams depicted in FIGS. 5A-5F are examples only and are not intended to be limiting.

Figure 5A:
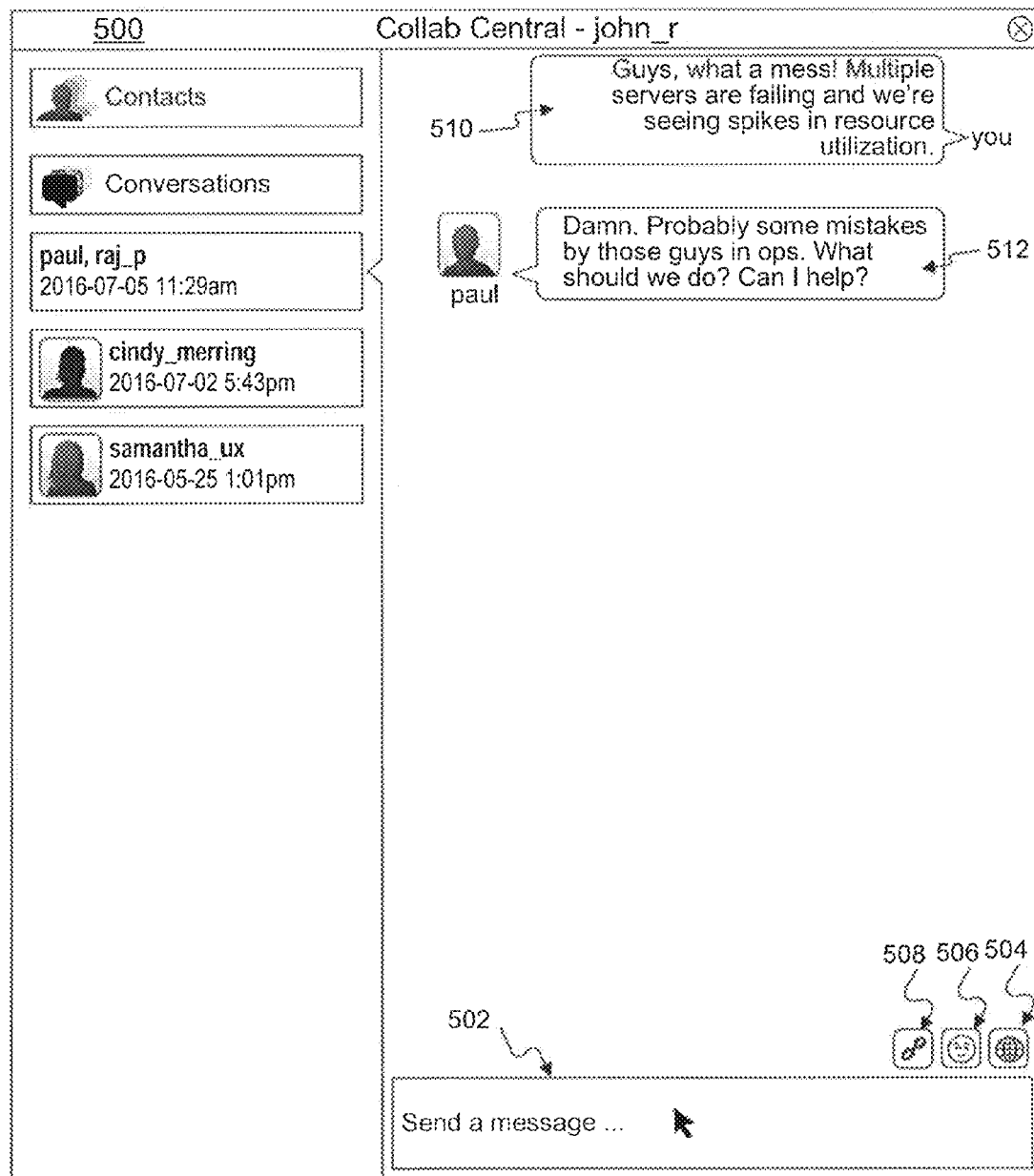
FIGS. 5A-5F are screen shots illustrating examples of graphical user interfaces (GUI) for temporarily suspending composition of electronic messages in chat conversations, in accordance with embodiments of the present disclosure.

FIG. 5A shows a display 500 of the example GUI displayed on terminal device 120. Display 500 is associated with a user named "john_r" who is a participant of an ongoing chat conversation. As shown, the conversation in this example includes three participants, i.e., "john_r," "paul," and "raj_p." In electronic message 510, "john_r" informs "paul" and "raj_p" about a situation, and "paul" responds with electronic message 512. In this figure "john_r" is about to start composing a new electronic message in input field 502 in response to the question that "paul" asked in electronic message 512. The GUI includes an input field 502 for composing new electronic messages and different GUI features (e.g., button 504, button 506, and button 508) for different functionalities. In some embodiments "john_r" may use button 504 to change the input language, use button 506 to insert an emoji in the current electronic message, and use button 508 to insert an attachment to chat conversation, for example, inserting an image in the current electronic message or inserting a document in a separate electronic message. In some examples, buttons 504, 506, 508 are icons, actuatable keys, or keys of a physical or virtual keyboard of the terminal device.

Figure 5B:
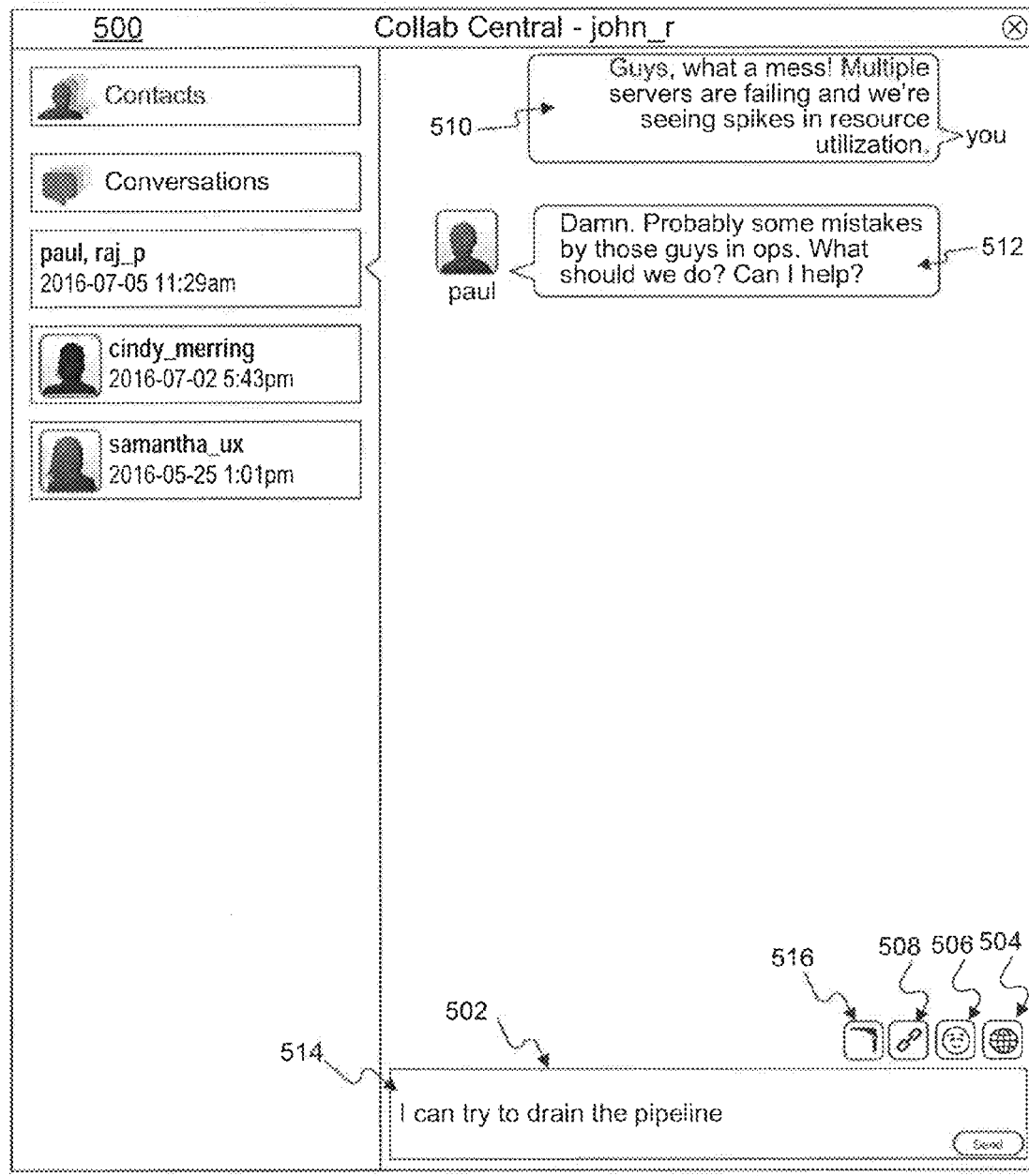

FIG. 5B shows another example GUI displayed on John's terminal device. The display in this figure shows input field 502 after "john_r" started to compose a response to Paul's question in electronic message 512. FIG. 5B includes a first electronic message 514, which is the electronic message "john_r" starts composing, and a GUI feature 516, which is a new button that appears in proximity to input field 502. In some embodiments GUI feature 516 is automatically presented after "john_r" starts entering text in input field 502. In this example the icon in GUI feature 516 is of a boomerang; however, as anyone skilled in the art will appreciate, the design of GUI feature 516 may be different. For example, GUI feature 516 may be a menu item, a text link, and more.

Figure 5C:
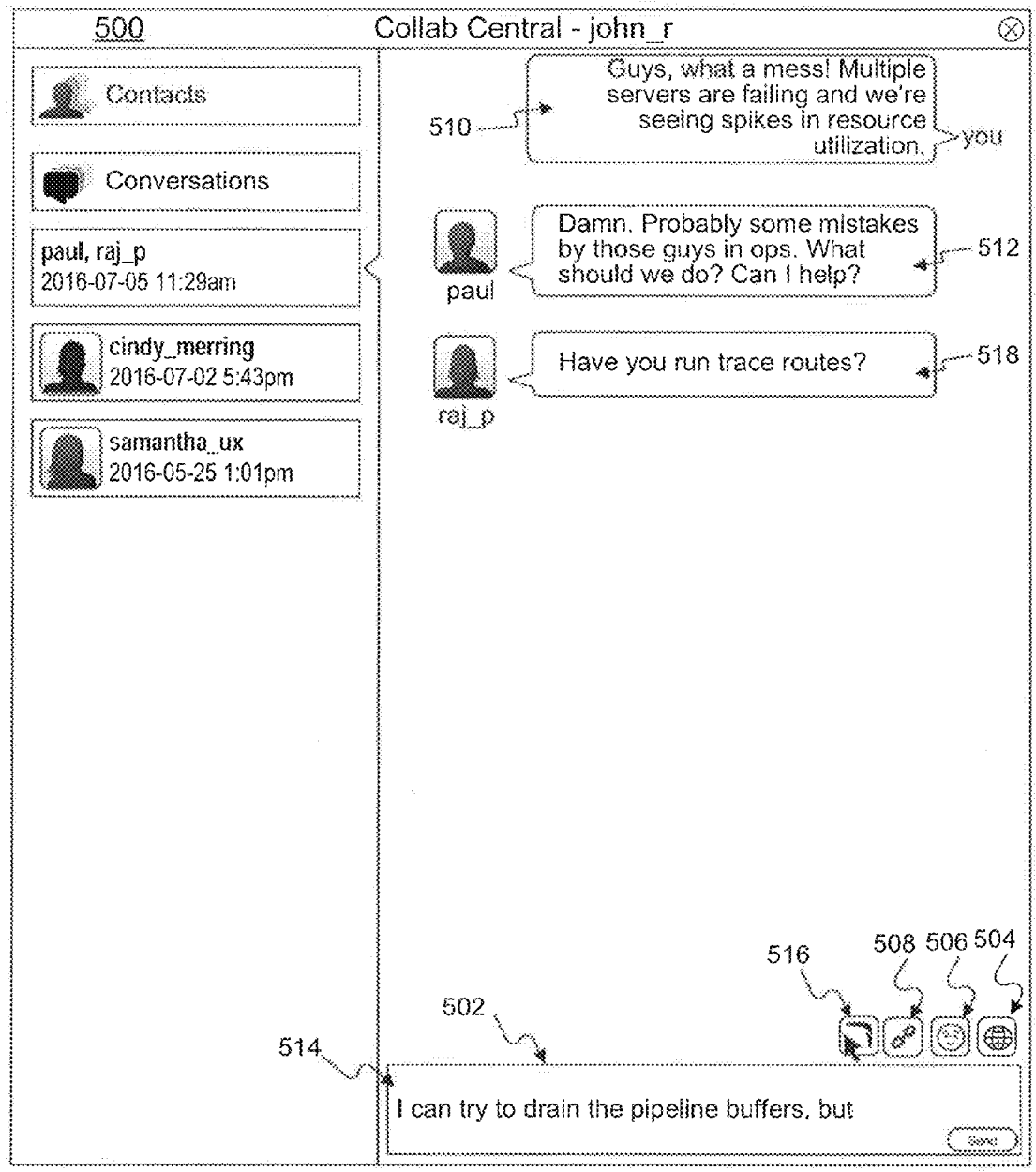

FIG. 5C shows another example GUI displayed on John's terminal device. In the display of this figure, "john_r" is still composing first electronic message 514 when "raj_p" asks him a question in electronic message 518. Electronic message 518 is considered as an interrupting electronic message because it was added to the conversation after "john_r" started composing first electronic message 514. An "interrupting electronic message" refers to, for example, any electronic message that was added to the conversation after a user starts to enter text in input field 502 but did not complete composition of the new electronic message. In one embodiment (not shown), GUI feature 516 may be automatically presented only after an interrupting electronic message is detected. Next, "john_r" is about to activate GUI feature 516. A "first drafting period" refers to, for example, a period of time, from when the composition of first electronic message 514 has started until GUI feature 516 was selected.

Figure 5D:
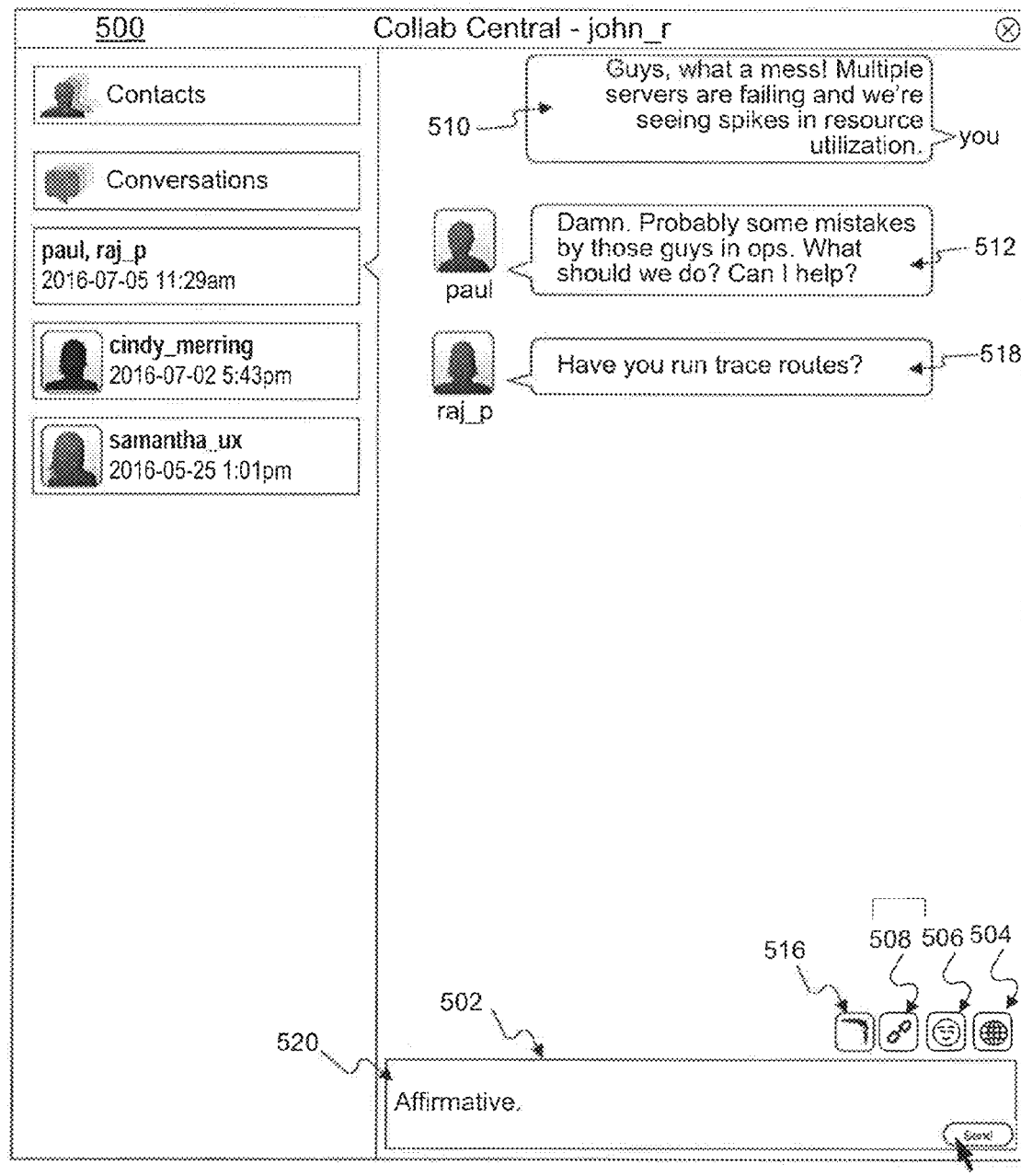

FIG. 5D shows another example GUI displayed on John's terminal device. The display in this figure is after "john_r" activated GUI feature 516. Consistent with the present disclosure, processing device 205 may identify the selection of GUI feature 516 as a request to temporarily suspend composition of first electronic message 514. Thereafter, processing device 205 may store in memory device 210 first electronic message 514 and clear input field 502 for composition of another electronic message. The period of time during which the composition of first electronic message 514 is suspended and first electronic message is stored in memory device 210 is referred to as a break period. As mentioned above, both terminal device 120 and server 110 may include processing device 205 and memory device 210, and they operate independently. Yet, in other embodiments, server 110 may instruct terminal device 120 to store a copy of first electronic message in its internal memory. In FIG. 5D, after input field 502 was cleared, "john_r" wrote a second electronic message 520 in response to electronic message 518. In the display of this figure, "john_r" has completed composition of second electronic message 520 and is about to add it to thread of the conversation.

Figure 5E:
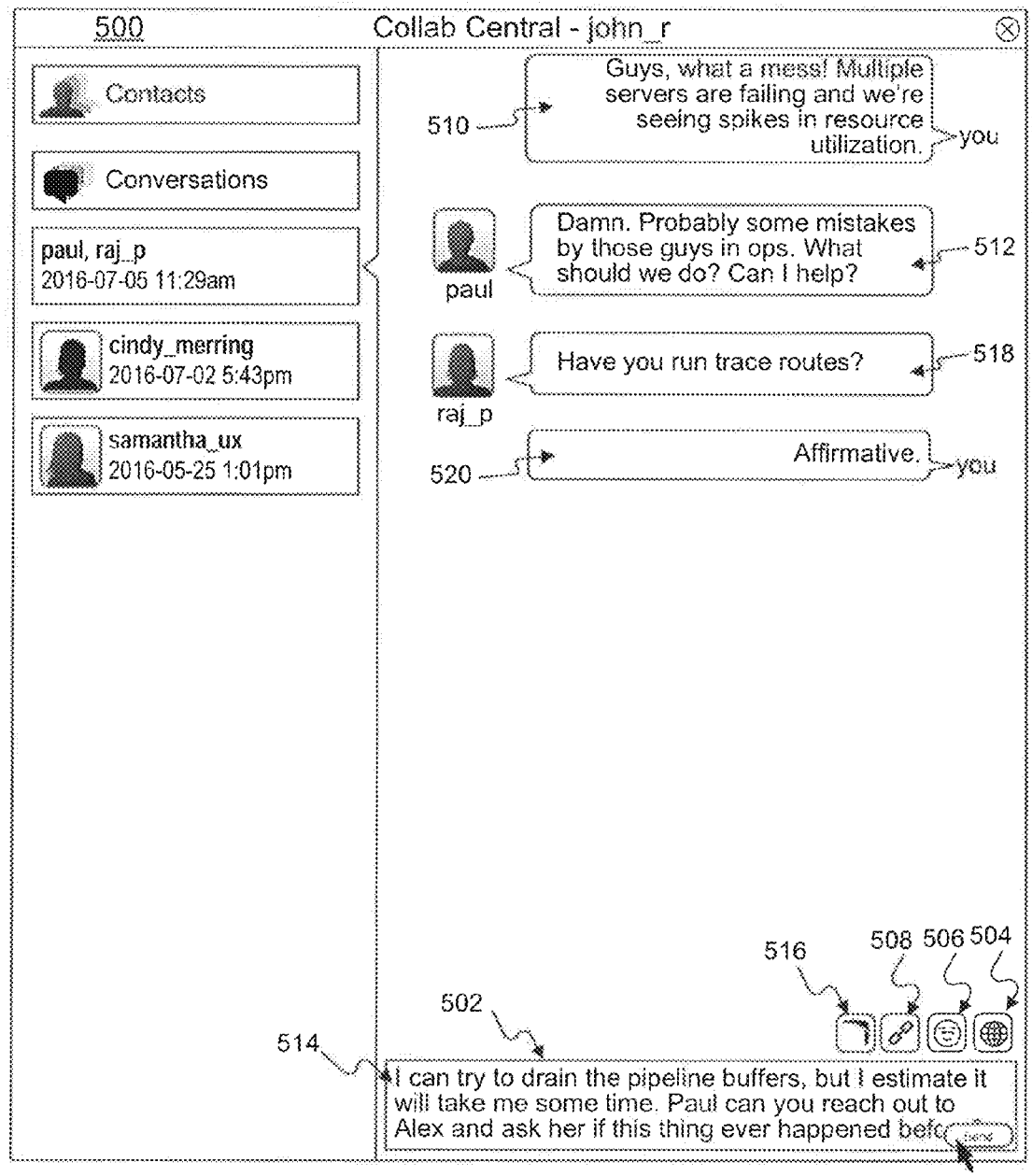

FIG. 5E shows another example GUI displayed on John's terminal device. The display in this figure is after second electronic message 520 was added to the conversation. Also the composition of first electronic message 514 has been completed and "john_r" is about to add it to the thread of the chat conversation. The period of time from when "john_r" resumes the composition of first electronic message 514 until it is added to the conversation is referred to as the second drafting period. According to one embodiment, after processing device 205 identifies that second electronic message 520 was added to the thread of the chat conversation, it automatically inserts first electronic message 514 in the input field thereby enabling completion of the composition first electronic message 514. This embodiment is discussed in greater detail below with reference to FIG. 6B. Specifically, the text "I can try to drain the pipeline buffers, but" that "john_r" wrote (before selecting GUI feature 516 in FIG. 5C) was inserted back to input field 502, and "john_r" completed his electronic message. According to another embodiment, processing device 205 can identify a request to resume composition of first electronic message 514, and only then processing device 205 inserts first electronic message 514 back to input field 502. For example, the request may be another selection of GUI feature 516. This embodiment is discussed in greater detail below with reference to FIG. 6A. In another embodiment, the user may be prompted by way of a modal dialog as to whether or not they would like to resume drafting of first electronic message 514.

Figure 5F:
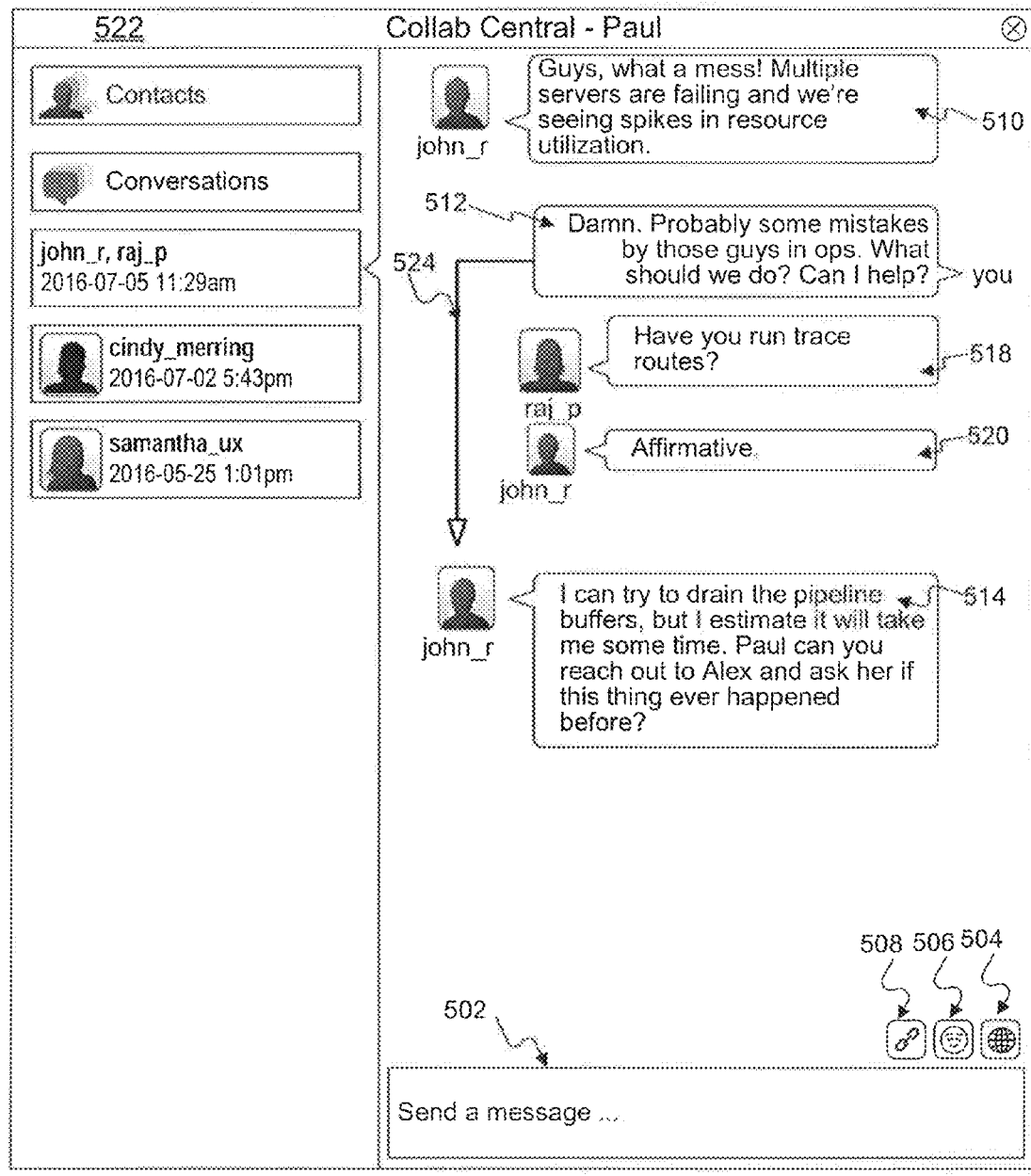

FIG. 5F shows a display 522 of the example GUI on terminal device 120 associated with the user named "paul," who is one of the participants of the conversation. As shown, first electronic message 514 is displayed in the conversation chronologically after second electronic message 520, although "john_r" started to compose first electronic message 514 before second electronic message 520. In some embodiments the example GUI may include an indication 524 that the composition of first electronic message 514 had started before second electronic message 520. In this example the indication is in the form of an arrow that goes from electronic message 512 to first electronic message 514. In addition, the example GUI may illustrate (not shown) that second electronic message 520 was in response to interrupting electronic message 518.

While in the example illustrated in FIGS. 5A-5F "john_r" added only one second electronic message 520, in some implementations processing device 205 is configured to enable transmission of a plurality of second electronic messages 520 before inserting first electronic message 514 in the input field or before adding it to the chat conversation. For example, if another interrupting electronic message from either "paul" or "raj_p" would be added to the conversation before "john_r" completes composing first electronic message 514, then "john_r" may wish to add another second electronic message to the thread of the chat conversation.

Figure 6A:
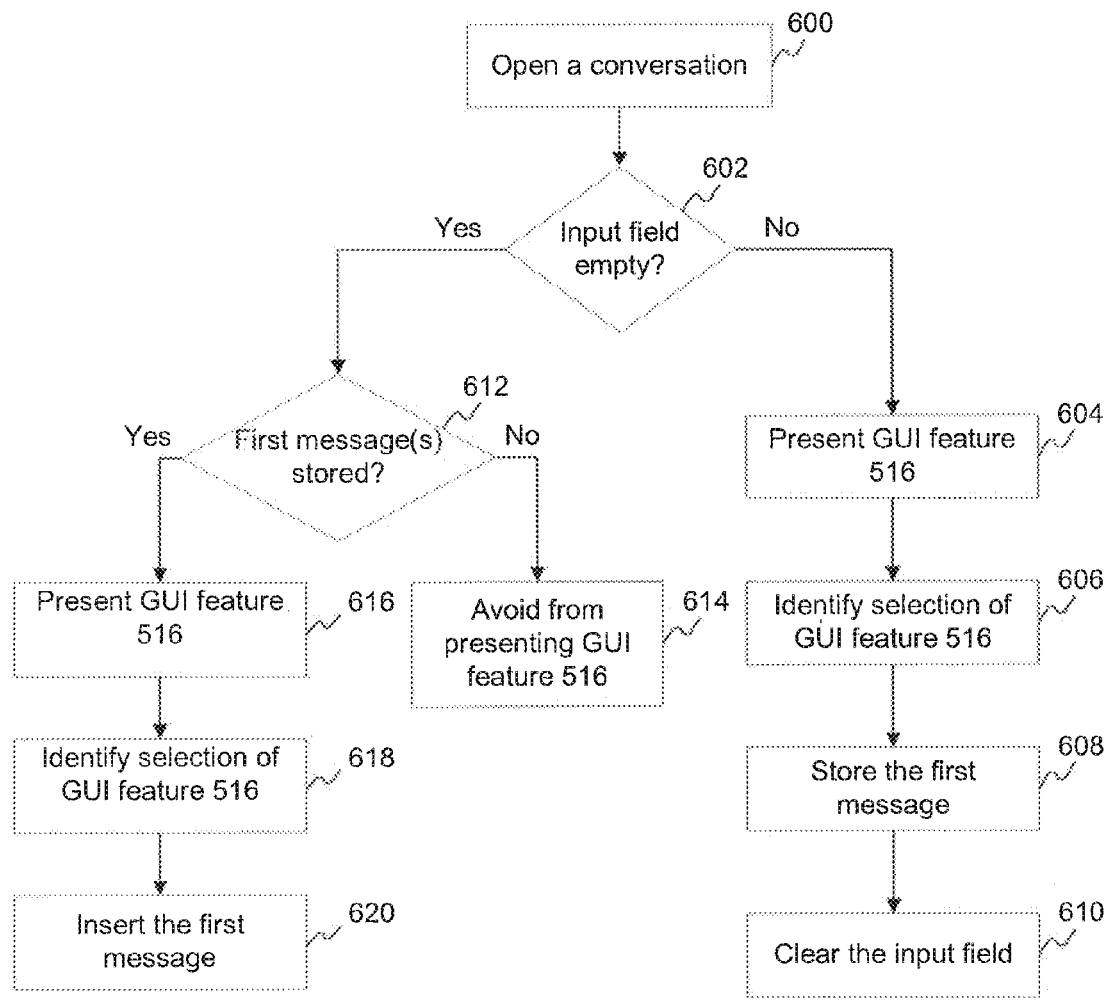
FIGS. 6A and 6B are flowcharts of example processes that may be implemented in the GUI illustrated in FIGS. 5A-5F, in accordance with embodiments of the present disclosure.

FIG. 6A is a flowchart of an example process used by processing device 205 according to one embodiment. The process begins when processing device 205 opens an electronic message exchange, such as, a chat conversation (block 600). Thereafter, processing device 205 determines whether input field 502 is empty (decision block 602). If input field 502 is not empty, processing device 205 presents GUI feature 516 in proximity to input field 502 (block 604). Thereafter, and upon identifying selection of GUI feature 516 (block 606), processing device 205 may store in memory device 210 first electronic message 514 (block 608) and clear the input field for composition of second electronic message 520 (block 610). If input field 502 is empty, processing device 205 determines whether memory device 210 stores any first electronic messages 514 (decision block 612). If input field 502 is empty and memory device 210 does not store any first electronic messages 514, processing device 205 may avoid presenting GUI feature 516 (block 614). But if input field 502 is empty and memory device 210 does store at least one first electronic message 514, processing device 205 may present GUI feature 516 in proximity to input field 502 (block 616). Thereafter, and upon identifying selection of GUI feature 516 (block 618), processing device 205 may insert the first electronic message 514 in input field 502, thereby enabling completion of the composition first electronic message 514 (block 620). In case there is a plurality of first electronic messages stored in memory device 210, processing device 205 may insert the most recent first electronic message, i.e., the latest electronic message that was suspended.

Figure 6B:
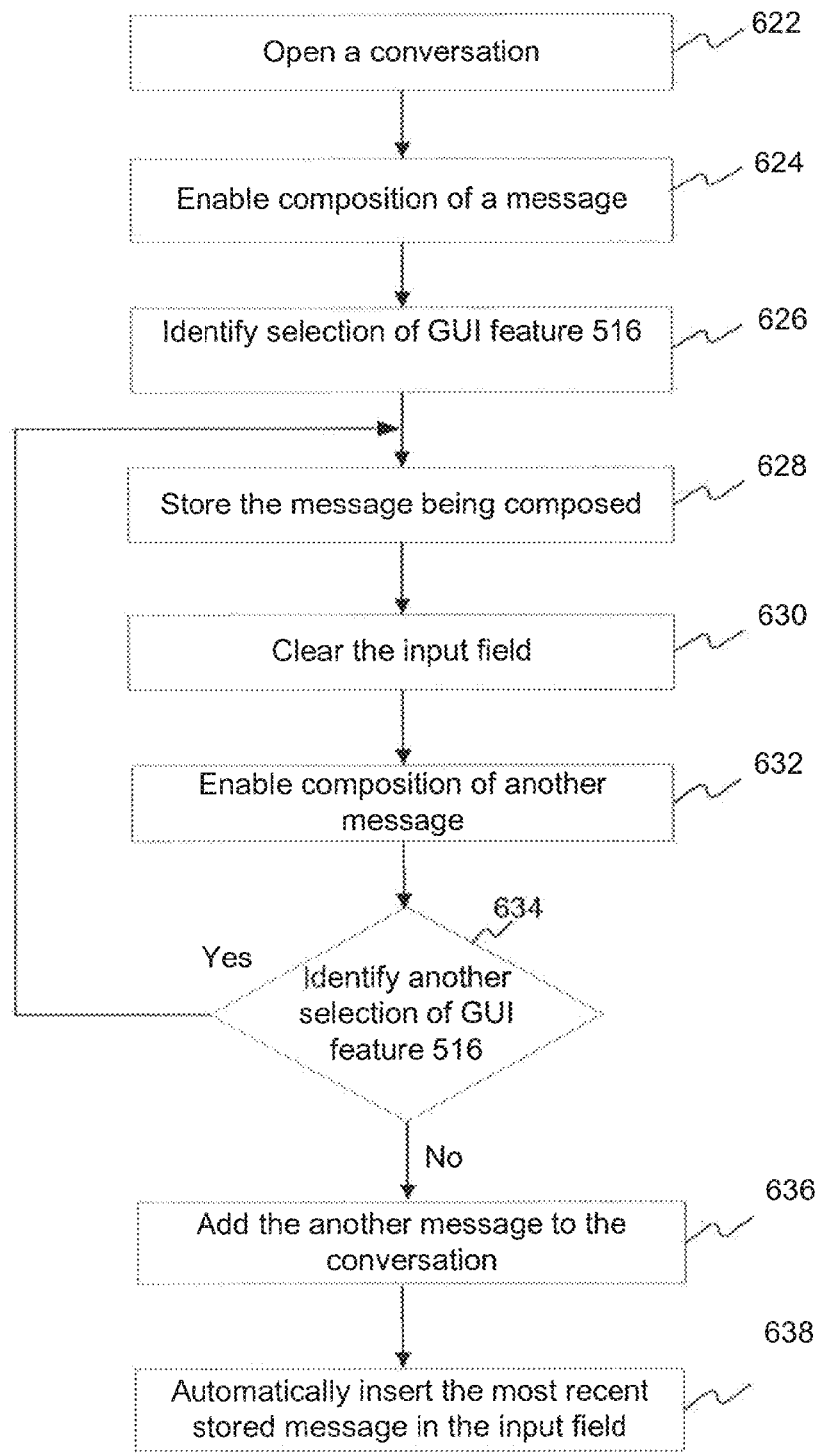

FIG. 6B is a flowchart of an example process that may be used by processing device 205 according to another embodiment. The process begins when processing device 205 opens an electronic message exchange, such as, a chat conversation (block 622). Thereafter, processing device 205 enables composition of an electronic message (block 624). Upon identifying selection of GUI feature 516 (block 626), processing device 205 may store in memory device 210 the electronic message (block 628) and clear the input field (block 630) to enable composition of another electronic message (block 632). Then, if processing device 205 identifies another selection of GUI feature 516 (decision block 634), processing device 205 repeats the steps in blocks 628-632. If not, and after the another electronic message is added to the conversation (block 636), processing device 205 is configured to automatically insert the most recent stored electronic message in the input field (block 638).

Figure 7:
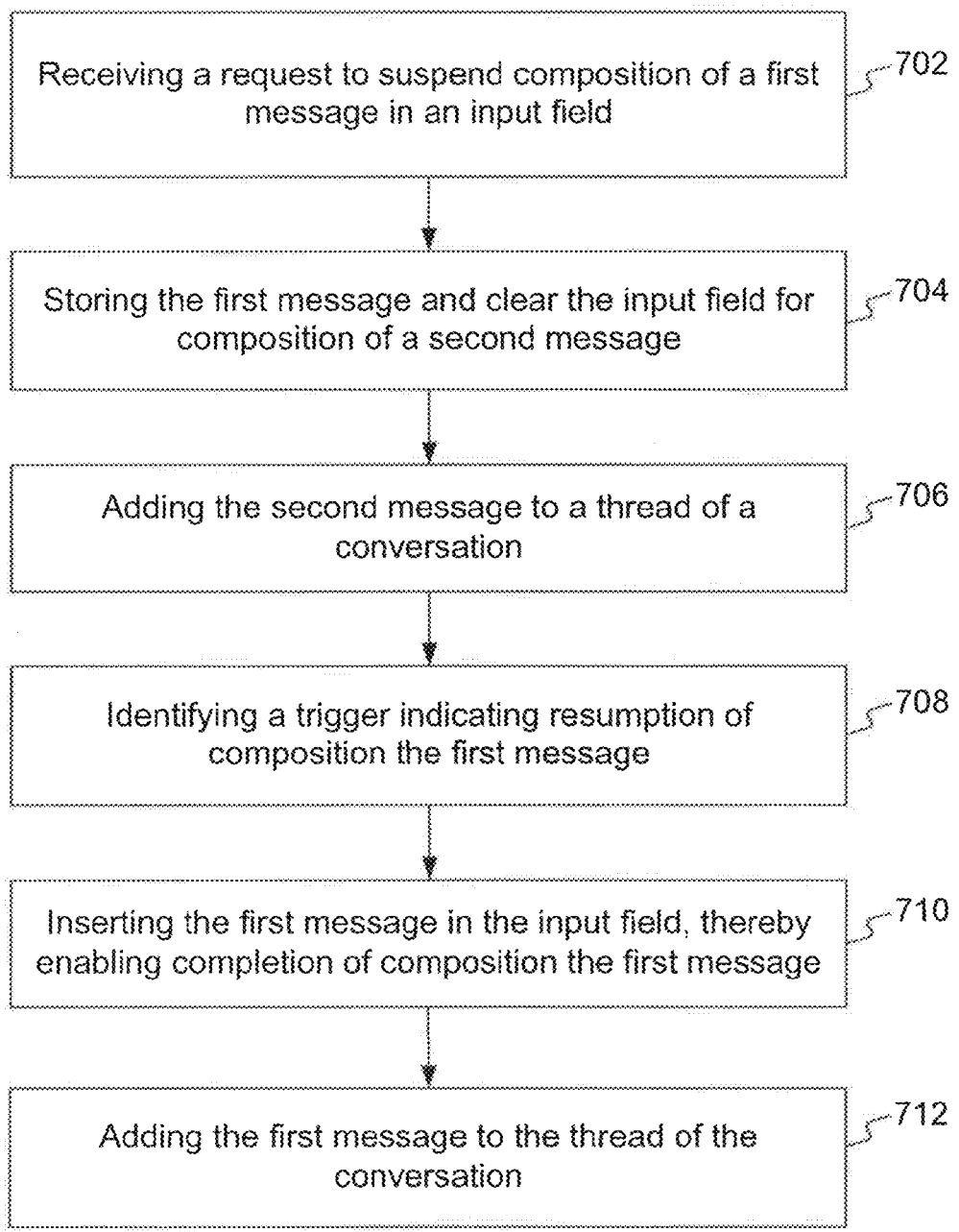
FIG. 7 is a flowchart of an example process for temporarily suspending composition of electronic messages in chat conversations, in accordance with embodiments of the present disclosure.

FIG. 7 is a flowchart of an example process 700 for temporarily suspending composition of electronic messages in conversations in accordance with embodiments of the present disclosure. A conversation may be any type of electronic message exchange among two or more users that occur using an application on terminal devices associated with the users that is configured to assist the users with the conversation. The steps of process 700 may be performed by communications device 200 of FIG. 2. In the following description, reference is made to certain components of FIGS. 2-4 for purposes of illustration. It will be appreciated, however, that other implementations are possible and that other components may be utilized to implement the example process.

In step 702, processing device 205 may receive a request to suspend composition of a first electronic message in an input field. Consistent with the present disclosure, the request may be associated with a keyboard shortcut (e.g., Shift+Q) or with an audio control command (e.g., "Sin, boomerang this electronic message"). Alternatively, the request may be associated with selection of a GUI feature presented in proximity to the input field, such as GUI feature 516 in FIG. 5B. In some embodiments GUI feature 516 may be presented when the input field is non-empty. For example, GUI feature 516 may be automatically displayed once the user enters text to the input field. In other embodiments GUI feature 516 may be presented when an electronic message was added to the conversation after the user started composing the first electronic message. For example, GUI feature 516 may be automatically displayed once an interrupting electronic message is added to the conversation. In addition, processing device 205 may provide a distinctive alert when the interrupting electronic message is received. The distinctive alert may differ from a regular alert provided when an electronic message is received in the conversation and the input field is empty.

Process 700 may be executed by server 110 or by terminal device 120. When step 702 is carried out by server 110 the request may be received from terminal device 120. For example, server 110 may receive data reflecting the selection of GUI feature 516 from terminal device 120 via network interface 315. However, when step 702 is carried out by terminal device 120 the request may be received from an input selection from I/O system 420. For example, terminal device 120 may receive signals reflecting the selection of GUI feature 516 from touch screen 424.

In step 704, processing device 205 may store in memory device 210 the first electronic message and clear the input field for composition of a second electronic message. The first electronic message is defined as any electronic message being composed during at least two drafting periods and at least one break period. In a drafting period, an electronic message is available in the input field and the user may edit it. In a break period, the electronic message is stored in memory device 210 and the user may add other electronic messages to a thread of the conversation. In some embodiments the first electronic message may include text, images, a voice recording, and a video recording. Further to storing the first electronic message, processing device 205 may store in memory device 210 context data related to the first electronic message. For example, the context data may include a timestamp associated with the first electronic message, or information associated with an electronic message that was added to the conversation before the first electronic message. The information may be derived using linguistic analysis techniques such as semantic-based text recognition, vector space analysis, rule-based analysis, statistical analysis, or other known techniques. The information may include the identity of the participant that sent the electronic message, the urgency of the electronic message, or the type of the electronic message (i.e., a question, a statement, etc.).

Processing device 205 may use some of the context data described above to provide a graphical indication illustrating that the composition of the first electronic message had started before the second electronic message. In an example where the conversation is between more than two participants, processing device 205 is further configured to identify at least one participant associated with the first electronic message using the context data and to provide a graphical indication that illustrates the connection between the first electronic message and the identified at least one participant. Indication 524 in FIG. 5F is one example of that graphical indication; it illustrates the connection between first electronic message 514, which responded to Paul's question, and the last electronic message "paul" sent. Other examples of graphical indications may include a time signature, the use of different colors, a double-line frame, etc.

In step 706, processing device 205 may add the second electronic message to a thread of the conversation. The second electronic message is defined as any electronic message that is being drafted while at least one first electronic message is being stored in memory device 210. In some embodiments processing device 205 may add a plurality of second electronic messages to the thread of the conversation, while at least one first electronic message is being stored in memory device 210. The second electronic message may include text, images, a voice recording, and a video recording.

In step 708, processing device 205 may identify a trigger indicating resumption of composition of the first electronic message. In one embodiment the trigger is adding the second electronic message to the conversation, and processing device 205 is further configured to automatically insert the first electronic message in the input field after transmission of the second electronic message. In the example illustrated in FIGS. 5A-5F, processing device 205 may insert the text "I can try to drain the pipeline buffers, but" back in input field 502, substantially concurrently with adding second electronic message 520 "Affirmative" to the conversation. In another embodiment the trigger is receiving a request to resume composition of the first electronic message, and processing device 205 is configured to enable transmission of a plurality of second electronic messages before inserting the first electronic message in the input field. In the example illustrated in FIGS. 5A-5F, after adding second electronic message 520 "Affirmative" to the conversation, processing device 205 may identify a selection of GUI feature 516 again. And, in response to the selection, processing device 205 may insert the text "I can try to drain the pipeline buffers, but" back in input field 502.

In one embodiment, while the first electronic message is stored in memory device 210, processing device 205 may receive an additional request to suspend composition of another electronic message in the conversation. The processing device 205 may store in memory device 210 the another electronic message and clear the input field for composition of a different electronic message. Thereafter, and responsive to a trigger indicating resumption of composition of the first electronic message or the another electronic message, processing device 205 may insert the first electronic message or the another electronic message in the input field.

In step 710, processing device 205 may insert the first electronic message in the input field, thereby enabling completion of the composition of the first electronic message, and in step 712 processing device 205 may add the first electronic message to the thread of the conversation. In some embodiments the first electronic message is displayed in the conversation chronologically after the second electronic message. The term "displayed in the conversation chronologically after" includes any configuration or design that indicates that the first electronic message (e.g., first electronic message 514) was added to the conversation more recently than the second electronic message (e.g., second electronic message 520). In one example the GUI may present first electronic message below the second electronic message. In another example the GUI may present the time each electronic message was added to the conversation; thus it will be clear that the first electronic message was transmitted after the second electronic message. In addition, in some embodiments, processing device 205 may present an indication that the beginning of the composition of the first electronic message was chronologically before the beginning of the composition of the second electronic message.

As explained, if the user has an electronic message that is currently being drafted, they can boomerang it to start drafting a different electronic message. The user can boomerang an electronic message currently being drafted for whatever reason—because they got an interrupting electronic message they would like to respond to first, or just because they thought of something else they would like to say first. In the preceding disclosure, various example embodiments have been described with reference to the accompanying drawings. It will, however, be evident that various modifications and changes may be made thereto, and additional embodiments may be implemented without departing from the broader scope of the disclosure as set forth in the claims that follow. The disclosure and drawings are accordingly to be regarded in an illustrative rather than restrictive sense.

Therefore, it is intended that the disclosed embodiments and examples be considered as examples only, with a true scope of the present disclosure being indicated by the following claims and their equivalents.

What is claimed is:

1. A communications device supporting electronic message exchange, the communications device comprising:
   a network interface;
   a memory; and
   at least one processor in communication with the network interface and the memory, the at least one processor is configured to:
      receive a request to suspend composition of a first electronic message in an input field associated with a live electronic message exchange between two or more participants;
      store in the memory the first electronic message and clear the input field for composition of a second electronic message;
      responsive to a trigger indicating resumption of the composition of the first electronic message, insert the first electronic message in the input field, thereby enabling completion of the composition of the first electronic message; and
      add the first electronic message to a thread of the live electronic message exchange, wherein the first electronic message is displayed together with the second message in the thread of the live electronic message exchange.

2. The communications device of claim 1, wherein the first electronic message is displayed in the thread of the live electronic message exchange chronologically after the second electronic message.

3. The communications device of claim 1, wherein the request is associated with a Graphical User Interface (GUI) feature presented in proximity to the input field.

4. The communications device of claim 3, wherein the GUI feature is presented when the input field is non-empty.

5. The communications device of claim 3, wherein the GUI feature is presented when an electronic message was added to the conversation after the composition of the first electronic message had started.

6. The communications device of claim 1, wherein the at least one processor is further configured to:
   store in the memory context data related to the first electronic message; and
   use the context data to provide in the live electronic message exchange a graphical indication that the composition of the first electronic message had started before the second electronic message.

7. The communications device of claim 6, wherein the context data includes a timestamp associated with the first electronic message.

8. The communications device of claim 6, wherein the context data includes information associated with an electronic message that was added to the thread of the live electronic message exchange before the first electronic message.

9. The communications device of claim 6, wherein the live electronic message exchange is between more than two participants and the at least one processor is further configured to identify at least one participant associated with the first electronic message using the context data and to provide a graphical indication that illustrates a connection between the first electronic message and the identified at least one participant.

10. The communications device of claim 1, wherein the at least one processor is further configured to identify the trigger indicating resumption of composition of the first electronic message, wherein the trigger is adding the second electronic message to the live electronic message exchange, and the at least one processor is further configured to automatically insert the first electronic message in the input field after adding the second electronic message to the live electronic message exchange.

11. The communications device of claim 1, wherein the at least one processor is further configured to identify the trigger indicating resumption of composition of the first electronic message, wherein the trigger is receiving a request to resume the composition of the first electronic message, and the at least one processor is configured to enable adding a plurality of second electronic messages to the thread of the live electronic message exchange before inserting the first electronic message in the input field.

12. The communications device of claim 1, wherein the at east one processor is further configured to:
   provide a distinctive alert when an electronic message is received in the live electronic message exchange while the first electronic message is being composed, wherein the distinctive alert differs from a regular alert provided when an electronic message is received in the live electronic message exchange and the input field is empty.

13. The communications device of claim 1, wherein while the first electronic message is stored in the memory, the at least one processor is further configured to:
   receive an additional request to suspend composition of another electronic message in the live electronic message exchange;
   store in the memory the another electronic message and clear the input field for composition of a different electronic message;
   responsive to a trigger indicating resumption of composition of the first electronic message or the another electronic message, insert the first electronic message or the another electronic message in the input field, thereby enabling completion of the composition of the first electronic message or the another electronic message.

14. The communications device of claim 1, wherein the communications device is a server and the request is received from a terminal device.

15. The communications device of claim 1, wherein the communications device is a terminal device and the request is received from an input component.

16. A computer program embodied in a non-transitory computer readable medium and executable by at least one processor associated with a memory, the computer program including instructions for supporting live electronic message exchange, the instructions comprising:
   receiving a request to suspend composition of a first electronic message in an input field associated with a live electronic message exchange between two or more participants;
   storing in the memory the first electronic message and clearing the input field for composition of a second electronic message;
   responsive to a trigger indicating resumption of composition of the first electronic message, inserting the first electronic message in the input field, thereby enabling completion of the composition of the first electronic message; and
   adding the first electronic message to a thread of the live electronic message exchange, wherein the first electronic message is displayed in the thread of the live electronic message exchange chronologically after the second electronic message.

17. The computer program of claim 16, wherein the request is associated with a Graphical User Interface (GUI) feature presented in proximity to the input field.

18. The computer program of claim 16, wherein the instructions further comprise:
   storing in the memory context data related to the first electronic message; and
   using the context data to include in the live electronic message exchange an indication that the composition of the first electronic message had started before the second electronic message.

19. The computer program of claim 16, wherein the instructions further comprise:
   identifying the trigger indicating resumption of composition of the first electronic message, wherein the trigger is adding the second electronic message to the live electronic message exchange, and the at least one processor is further configured to automatically insert the first electronic message in the input field after transmission of the second electronic message.

20. The computer program of claim 16, wherein the instructions further comprise:
   identifying the trigger indicating resumption of composition of the first electronic message, wherein the trigger is receiving a request to resume composition of the first electronic message, and the at least one processor is configured to enable transmission of a plurality of electronic messages before inserting the first electronic message in the input field.

21. A server for supporting live electronic message exchange, the server comprising:

a network interface;

a memory; and at least one processor in communication with the network interface and the memory, the at least one processor is configured to:

- receive a request to suspend composition of a first electronic message in an input field associated with live electronic message exchange between two or more participants;
- store in the memory the first electronic message and clear the input field for composition of a second electronic message;
- after the second electronic message is added to the live electronic message exchange, automatically insert the first electronic message in the input field, thereby enabling completion of the composition of the first electronic message; and
- add the first electronic message to a thread of the live electronic message exchange, wherein the first electronic message is displayed in the live thread of the electronic message exchange.

* * * * *